United States Patent [19]

Flax

[11] Patent Number: 4,997,532

[45] Date of Patent: Mar. 5, 1991

[54] PROCESS FOR EXTRACTING NOBLE METALS

[75] Inventor: Solomon Flax, Jerusalem, Israel

[73] Assignee: Satec Ltd., Israel

[21] Appl. No.: 458,154

[22] Filed: Dec. 28, 1989

[30] Foreign Application Priority Data

Dec. 30, 1988 [IL] Israel .................................. 88852

[51] Int. Cl.$^5$ .......................... C25C 1/20; C22B 11/00
[52] U.S. Cl. .................. 204/105 R; 204/109; 204/111; 423/22; 423/23; 423/38
[58] Field of Search .................. 204/105 R, 109, 111; 75/102, 101 R, 118 R, 121; 423/22, 23, 38

[56] References Cited

U.S. PATENT DOCUMENTS 4,551,213 11/1985 Wilson ................................ 204/130
4,684,404 8/1987 Kalocsai ................................ 423/38

*Primary Examiner*—John F. Niebling
*Assistant Examiner*—David G. Ryser
*Attorney, Agent, or Firm*—Wolder, Gross & Bondell

[57] ABSTRACT

The invention provides a hydrometallurgical process for extracting noble metals from raw materials containing the same, comprising
(a) leaching the raw materials with a mineral acid to leave a residue containing the noble metals,
(b) treating said residue with a substantially non-aqueous liquid comprising bromine and an apolar organic solvent in which bromine dissolves, to form a complex of the formula $$R[MeBr_x]$$

wherein
x = 4–6
Me = Au, Ag, Pt, Pd
Os, Ru, Rh, Ir
and R is an organic moiety of the solvent, and
(c) subjecting the complex-containing substantially non-aqueous liquid to electrolysis whereby noble metal is deposited on the cathode and removable therefrom and bromine liquid is formed at the anode and immediately dissolves in the organic solvent.

12 Claims, No Drawings

PROCESS FOR EXTRACTING NOBLE METALS

BACKGROUND OF THE INVENTION

The present invention relates to a hydrometallurgical process for extracting noble metals from raw materials containing the same.

The literature is replete with descriptions of various processes for recovering noble metals, and especially gold and silver, from raw materials containing the same.

Thus, e.g. a method is known whereby gold and other noble metals are extracted by treating concentrates and ores as well as secondary wastes of jewellery and other industries with solutions of cyanides of alkali metals with subsequent separation of noble metals with the aid of zinc powder, by solution regeneration and refining of separated noble metals.

This type of method is described in British Patent No. 2,156,794 in which carbonaceous Au ores are leached with an alkali cyanide solution containing $\geq 0.3\%$ alkali hydroxide for $\geq 5$ kg/ton ore in excess of neutralization requirements.

There also exists a method of extracting gold and other noble metals by leaching in thiourea solutions with subsequent precipitation (cementation) by zinc powder, regeneration of thiourea and zinc, and refining of separated noble metals. Thus, as described by Won, Chang Whan; Cho, Tong Rae (Coll. Eng., Chungnam Univ., S. Korea). Taehan Kwangsan Hakhoe Chi. 1985, 22(3), 215-230 (Korean), the dissolution of Au in acidic solutions of thiourea containing $Fe^{3+}$ oxidant was studied. By using a rotating pure disk, Au can be dissolved at much greater rate by acidic solutions of thiourea than is possible by conventional cyanidation. Dissolution rates are dependent on thiourea and oxidant concentration and are controlled partially by chemical phenomena and partially by transport of ions (thiourea and oxidant) to the surface.

There exist also methods of extracting gold and other noble metals by dissolving raw materials in acid solutions in the presence of strong oxidants, e.g. aqua regia, elementary chlorine, etc.

In U.S. Pat. No. 4,551,213 Au is recovered from the slurries from hydrometallurgical processing of Cu sulfide ores by: (a) adding $\geq 12\%$ chloride; (b) maintaining oxidation potential of the slurry at 650-750 mV between room temperature and $\pm 106°$, optionally with addition of a strong oxidizer such as Cl gas; and (c) adding $CuCl_2$ or $FeCl_3$ to promote ionization of Au to form $AuCl_4^-$. The loaded solution is treated for Au recovery by electrolysis or adsorption on powdered C. The spent electrolyte is reoxidized in an anode compartment, and recycled for pulp treatment in a continuous process. The Au is optionally recovered from wastes and scrap in manufacturing of electrical circuit boards.

Similarly in Indian Patent No. 155,454 there is described a process wherein lean ores containing Ag and optionally Au are leached in concentrated chloride solutions or brines to promote formation of AgCl and to enhance solubility by complexing with the chloride. Recovery of Au is improved by addition of a strong oxidant such as Cl gas or a hypochlorite, as well as pH control in leaching.

Existing processes involve the use of extremely harmful toxic substances (e.g. cyanides, nitric oxides, elementary chlorine etc.) which require the creation of very expensive special protective measures for the personnel and environment. Moreover, the existing processes do not allow poor raw materials to be processed with sufficient economic efficiency, and involve many complicated stages and high labour content. Some raw materials, such as clay ores and graphite crucible wastes used for gold melting, cannot be processed at all by existing methods.

SUMMARY OF THE INVENTION

With this state of the art in mind there is now provided a hydrometallurgical process for extracting noble metals from; raw materials containing the same, comprising
(a) leaching said raw materials with a mineral acid to leave a residue containing said noble metals,
(b) treating said residue with a substantially non-aqueous liquid (as defined herein) comprising bromine and an apolar organic solvent in which bromine dissolves, to form a complex of the formula $$R[MeBr_x]$$

wherein
x = 4–6
Me = Au, Ag, Pt, Pd
Os, Ru, Rh, Ir
and R is an organic moiety of the solvent, and
(c) subjecting said complex-containing substantially non-aqueous liquid to electrolysis whereby noble metal is deposited on the cathode and removable therefrom and bromine liquid is formed at the anode and immediately dissolves in said organic solvent.

The term raw materials as used herein includes ores and any secondary raw material containing at least 2 g/ton and up to 30 or even 50% concentrations of noble metals. Specifically the term secondary raw materials as used herein includes wastes, sweeps and final slag of jewelry industry, scraps of jewelry product, scraps and wastes of electronics, etc.

The term substantially non-aqueous liquid as used herein is intended to indicate that the liquid contains not more than 10% and preferably not more than about 5% water as found e.g. in commercial 95% ethyl alcohol.

As will be realized, in counterdistinction to the prior art processes in which strong acids such as aqua regia were used to dissolve the noble metals into aqueous solutions in which they were further treated, in the present invention a mineral acid, i.e. nitric, phosphoric, hydrochloric or sulphuric acid, is used to extract the non-precious metals, leaving the noble metals which are then extracted in an organic layer where they form a complex with the bromine contained in said solvent.

Preferably said acid is a dilute strong acid such as hydrochloric acid or sulfuric acid and hydrochloric acid of a concentration of about 15–35% is especially preferred.

The solvent used can be any apolar organic solvent in which bromine dissolves and said solvent can preferably be selected from acetone, a $C_1$–$C_3$ alcohol, carbon disulfide, carbontetrachloride, chloroform, bromoform, ethylether and pyridine.

An especially preferred solvent is ethyl alcohol.

Thus referring to an extraction of gold using ethyl alcohol as the solvent for the bromine, the gold in the solid residue is passed into solution as a complex compound, according to the following reactions $$C_2H_5OH + HBr \rightarrow C_2H_5Br + H_2O$$

$$2Au + 3Br_2 \rightarrow 2AuBr_3$$

$$AuBr_3 + C_2H_5Br \rightarrow C_2H_5[AuBr_4]$$

Alcohol solution of bromides of gold and other noble metals can then be separated by filtration from the solid residue (cake) and the solution is then transferred to an electrolysis bath where gold (and/or other noble metals) powder is deposited at the cathode and elementary bromium forms at the anode, and immediately dissolves in alcohol (or any other organic) solution whereupon the solution can be used again in the process. Noble metals powder can be subsequently refined using known technological methods.

Said electrolysis can be carried out under varying conditions at a rectified current voltage of about 0.7–6 V and a cathode current density of about 50–200 A/m$^2$.

Preferably said electrolysis is carried out at a rectified current voltage of about 2.5–3 V and a cathode current density of about 140–160 A/m$^2$.

In U.S. Pat. No. 4,684,404 there is described a method of dissolution of noble metals in aqueous solution in the presence of an oxidant, elementary bromine and various salts serving as cation donors.

More specifically, said Patent teaches and claims a process of dissolving metallic gold or removing metallic gold from a gold-containing material comprising the steps of:

(a) contacting metallic gold or a gold-containing material with an aqueous bromine-based composition comprising:
at least one source of cations, which source is able to highly dissociate in the solution, said source being a strong base or producing in solution at least one cation selected from the group consisting of sodium, potassium, ammonium, ferric and lithium ions; a halogen source capable of liberating an effective amount of bromine in a concentration of not more than 5 wt %; and sufficient acid or base such that the pH of the composition in contact with said gold is in the range of 5.6 to 8.5, to dissolve the gold in the aqueous composition; and
(b) recovering the dissolved gold from the aqueous composition.

In U.S. Pat. No. 732,708, dated July 7, 1903 there is described and claimed a "Process of extracting gold from ores" which process is based on a similar mechanism, and which mechanism is substantially different from that of the present invention as will be described and explained hereinafter.

The process mechanism described in the above patents can be presented as follows. At the first stage a process of oxidizing of various ore components such as noble metals, $Fe^{+2} \rightarrow Fe^{+3}$, $Mn^{+2} \rightarrow Mn^{+4}$, $S^{+2} \rightarrow S^{+4}$ etc. by bromine takes place. Where secondary wastes are to be processed, bromine is spent primarily for oxidizing iron, copper, aluminium etc. contained in such wastes according to the following reactions:

$$2Au + 3Br_2 \rightarrow 2AuBr_3$$

$$2Ag + Br_2 \rightarrow 2AgBr$$

$$Pt + 2Br_2 \rightarrow PtBr_4$$

$$FeO + \tfrac{1}{2}Br_2 + 2HBr \rightarrow FeBr_3 + H_2O$$

$$CuS + 3Br_2 + 2H_2O \rightarrow CuBr_2 + SO_2 + 4HBr, \text{ etc.}$$

Simultaneously, a process of interaction of bromine with other ore components and those of secondary wastes, e.g. with metal carbonates, takes place according to the following reaction:

$$MCO_3 + 2Br_2 + H_2O \rightarrow MBr_2 + 2HOBr + CO_2$$

where M can be Ca, Mg, Fe etc.

It can be seen from the thermodynamic data of all the above processes that the first processes to take place will be those where all base metals and their salts interact with bromine, and only after them, noble metals will participate in reactions. This will result in extremely large bromine consumption. Thus, there exists a large class of ores containing free metal carbonates as well as metal oxides not connected with silicates, which cannot be processed economically using the processes in accordance with the above patents.

At the second stage a process of interaction of noble metals' bromides with complexing agents-donors takes place. Such agent donors include:

NaCl, NaOH, NH$_4$Cl, NaBr, ZnBr$_2$, Li$_2$B$_4$O$_7$, etc.

The reaction involved when using such agent donors as NaCl is:

$$AuBr_3 + 4NaCl \rightarrow NaAuCl_4 + 3NaBr, \text{ etc.}$$

whereby NaAuCl$_4$ is being formed, and not NaAuBr$_4$ as in the present invention.

As stated, U.S. Pat. No. 4,684,404 is based on a different mechanism which involves contacting the gold-containing material with an aqueous bromine based composition containing at least one source of cations.

From Table A appearing in column 8 of said patent it can be seen that according to the methods and teachings of said patent the absence of the donor makes it impossible to extract gold from the ore. Moreover, not a single example is given of gold extraction in nonaqueous solutions, e.g. alcohol solutions. The fact that use of small alcohol quantities is mentioned can be attributed to its use as bromine solvent.

In contradistinction the mechanism of the present invention does not involve or rely upon cation donors and to avoid bromine interaction with base metals, it is provided that those metals are first removed with the aid of mineral acids.

It has further been found that leaching in aqueous medium at various conditions; e.g. temperature from 25°–50° C.; leaching time 30 min.–2 hrs; acidity 3 g/l to 32% HCl and various bromine contents of even up to 50-fold excess as compared with the theoretically required quantity, have not allowed gold and silver to be extracted into solution. Furthermore, the reduction in the alcohol concentration from 95% to 90% decreases the gold extraction to 50% and the reduction in the alcohol concentration to 50% decreased the gold extraction to 20%. Thus it is clear that said patents neither teach nor suggest the process of the present invention.

DESCRIPTION OF PREFERRED EMBODIMENTS

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE 1

Ground graphite crucibles were treated according to the present process as a secondary gold-containing raw material, with gold content of 5.5 g/kg, silver content of 0.6 g/kg, platinum content of 0.2 g/kg. 100 g of material were leached in diluted 1:1 hydrochloric acid solution, with solid to liquid ratio equal to 1:2 at a temperature from 95° to 100° C. for 2 hours, whereupon the solution was filtered and the solid residue washed with water and treated by elementary bromine solution in ethyl alcohol, with a concentration of 40 g/l $Br_2$ and solid to liquid ratio equal to 1:3 at room temperature for 2 hrs, whereupon the solution was again filtered. Then the treatment of the solid residue by bromium alcohol solution was repeated. The first operation allowed 80.0% of gold to be transferred to the solution, and the second one, another 18%, the total gold extraction being 98.0%, that of silver, 97.8% and of platinum, 98.1%. Alcohol solution containing noble metals was passed to gold electrolytic extraction in a closed-type glass electrolysis bath. An aluminium plate was used as the cathode and a graphite element as the anode. The rectified current voltage was 2.5 to 3 V, cathode current density 150 A/m$^2$. Elementary bromine which was released at the anode dissolved immediately in alcohol solution, whereby the solution could be reused for extracting noble metals from next raw material portion. Noble metals at the cathode were deposited as powder which was removed periodically, refined and remelted under flux in a muffle furnace. The extraction to the final product was 96% for gold, 95.8% for silver and 96.17% for platinum.

EXAMPLE 2

Under the above conditions (see Example 1) the treatment of gold (noble metal) containing raw materials by 15% solution of hydrochloric acid was carried out at s(olid):l(liquid) ratio s:l of 1:3. The extraction to the final product (EFP) was: Au—96.1%, Ag—95.9% and Pt—96.1%.

EXAMPLE 3

Under the above conditions the s:l ratio when treating the raw materials with 15% hydrochloric acid solution was maintained at 1:5. EFP was: Au—95.8%, Ag—95.9%, and Pt—96.0%.

EXAMPLE 4

Under the above conditions the s:l ratio when treating the raw materials with 15% hydrochloric acid solution was maintained at 1:1. Under those conditions no full dissolution of iron, copper and other metals took place. It was necessary to treat the material three times with bromium solution in alcohol, whereupon the extraction of noble metals to the final product was about 95.%. If the treatment was carried out two times only, the extraction was 83% only.

EXAMPLE 5

Under the above conditions the treatment of the raw materials was carried out with concentrated hydrochloric acid (32 HCl) at s:l of 1:1. EFP was 95.5%.

EXAMPLE 6

Under the above conditions the treatment was carried out with concentrated hydrochloric acid (32% HCl) at s:l of 1:3. EFP virtually did not increase, it was 95.6%. During that treatment difficulties were encountered connected with the release of HCl, filtration of strong solutions and washing off the deposit to remove the excessive hydrochloric acid.

EXAMPLE 7

Under the above conditions processing of ground graphic crucibles was carried out with 20% solution of sulphuric acid. EFP was 96.2%.

EXAMPLE 8

Under the above conditions the raw materials were treated with 25% nitric acid. EFP was 95.9%.

EXAMPLE 9

Under the above conditions other acids were used to dissolve non-ferrous and ferrous metals: phosphoric, hydrofluoric, acetic etc. The results thus obtained were similar to those in Example 1.

EXAMPLE 10

Under the above conditions the treatment of the residue after the leaching with hydrochloric acid was carried out with bromium solution in ethyl alcohol, at a concentration of 40 g/l Br and s:l. EFP of noble metals after two treatments was 90%. The first treatment enabled us to transfer to the solution 68% of metals, and the second one another 22%. To increase the extraction to the solution as in Example 1, a third treatment was required, with solution of bromium in alcohol.

EXAMPLE 11

Under the above conditions the materials were treated with alcohol solution containing 62.8 g/l Br at s:l of 1:3. Extraction to the solution was 98.2%, and EFP 96.2%. Thus, the increase in concentration gave virtually no increase in extraction.

EXAMPLE 12

Under the above conditions the treatment was carried out with alcohol solution containing 20 g/l Br at s:l of 1:3. EFP was 95.6%.

EXAMPLE 13

Under the above conditions the treatment was carried out with alcohol solution containing 20 g/l Br at s:l of 1:2. EFP was 89%. An additional, third treatment allowed the extraction to be increased to 96.1%.

EXAMPLE 14

Under the above conditions the treatment of gold containing raw materials was carried out with solution of bromium in chloroform, methyl alcohol, bromoform and other organic solvents. EFP did not depend on the solvent and was ≧95%.

EXAMPLE 15

Under the above conditions the treatment with alcohol bromium solution was carried out at a temperature of 35° C. EFP figures were similar to those in Example 1 (96%). However, treatment time was decreased by 0.5 hr.

EXAMPLE 16

Under the above conditions (see Example 1) the process was carried out of ground refractory bricks (after the end of the furnace lifetime where gold had been melted). Gold content in the waste was 3.1 g/kg waste. The extraction to the final product was 93.5%.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A hydrometallurgical process for extracting noble metals from raw materials containing said noble metals comprising
   (a) leaching said raw materials with a mineral acid to leave a residue containing said noble metals and substantially free of cations and cation donors,
   (b) treating said residue with a substantially non-aqueous liquid comprising bromine and an apolar organic solvent in which bromine dissolves, to form a complex of the formula $R[MeBr_x]$ wherein
   $x = 4-6$
   Me = Au, Ag, Pt, Pd, Os, Ru, Rh, Ir
   and R is an organic moiety of the solvent, and
   (c) subjecting said complex-containing substantially non-aqueous liquid to electrolysis in an electrolysis cell having an anode and a cathode whereby noble metal is deposited on the cathode and removable therefrom and bromine liquid is formed at the anode and immediately dissolves in said organic solvent.

2. A process according to claim 1 wherein said raw material contains at least 2 g/ton of noble metals.

3. A process according to claim 1 wherein said noble metal is gold.

4. A process according to claim 1 wherein said mineral acid is selected from hydrochloric and sulphuric acid.

5. A process according to claim 1 wherein said acid is dilute hydrochloric acid having a concentration of about 15 to 35%.

6. A process according to claim 1, wherein said solvent is selected from the group consisting of acetone, $C_1$–$C_3$ alcohols, carbon disulfide, carbontetrachloride, chloroform, bromoform, ethylether and pyridine.

7. A process according to claim 1 wherein said solvent is ethyl alcohol.

8. A process according to claim 1 wherein said residue is treated with said substantially non-aqueous liquid at room temperature.

9. A process according to claim 1 wherein said electrolysis is carried out at a rectified current voltage of about 0.7–6 V and a cathode current density of about 50–200 A/m$^2$.

10. A process according to claim 1 wherein said electrolysis is carried out at a rectified current voltage of about 2.5–3 V and a cathode current density of about 140–160 A/m$^2$.

11. A process according to claim 1, comprising the further step of recycling the noble metal depleted and bromium-enriched solution after electrolysis for treating a subsequent charge of said raw materials.

12. A process according to claim 1, wherein said leaching step includes rinsing said residue with water to remove residual cations.

* * * * *